United States Patent
Paul et al.

(10) Patent No.: US 11,572,107 B2
(45) Date of Patent: Feb. 7, 2023

(54) DRIVE UNIT AND METHOD FOR CONTROLLING A DRIVE UNIT, IN PARTICULAR FOR AN AIR DEFLECTOR ELEMENT OF A MOTOR VEHICLE

(71) Applicant: Dr. Ing. h.c. F. Porsche Aktiengesellschaft, Stuttgart (DE)

(72) Inventors: Joachim Paul, Benningen a.N. (DE); Chris Paulus, Calw-Stammheim (DE); Thomas Huebener, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 1038 days.

(21) Appl. No.: 16/268,504

(22) Filed: Feb. 6, 2019

(65) Prior Publication Data
US 2019/0241221 A1  Aug. 8, 2019

(30) Foreign Application Priority Data
Feb. 8, 2018 (DE) ................ 10 2018 102 820.2

(51) Int. Cl.
| B62D 35/00 | (2006.01) |
| H02P 29/60 | (2016.01) |
| B62D 37/02 | (2006.01) |
| H02P 29/68 | (2016.01) |

(52) U.S. Cl.
CPC .......... *B62D 35/007* (2013.01); *B62D 37/02* (2013.01); *H02P 29/60* (2016.02); *H02P 29/68* (2016.02)

(58) Field of Classification Search
CPC ....... B62D 35/007; B62D 37/02; H02P 29/60; H02P 29/68

USPC ......................................................... 701/49
See application file for complete search history.

(56) References Cited

U.S. PATENT DOCUMENTS

| 5,351,439 A | 10/1994 | Takeda et al. | |
| 2009/0088294 A1* | 4/2009 | West | H02P 29/0241 701/99 |
| 2017/0025848 A1* | 1/2017 | Perkins | H02K 11/20 |
| 2017/0284828 A1 | 10/2017 | Rodger et al. | |
| 2018/0079405 A1* | 3/2018 | Gaither | B60W 10/22 |

FOREIGN PATENT DOCUMENTS

| CN | 203014602 U | 6/2013 |
| CN | 104670348 A | 6/2015 |
| CN | 105429356 A | 3/2016 |
| CN | 106379426 A | 2/2017 |
| CN | 106515373 A | 3/2017 |
| DE | 102006061367 A1 | 6/2008 |
| DE | 102005051137 B4 | 6/2010 |
| DE | 102013100518 A1 | 4/2014 |

(Continued)

OTHER PUBLICATIONS

English Translation for EP-2716529-A2 (Year: 2022).*

*Primary Examiner* — Mahmoud S Ismail
(74) *Attorney, Agent, or Firm* — Leydig, Voit & Mayer, Ltd.

(57) ABSTRACT

A drive unit for an air deflector element of a motor vehicle includes a drive motor transmission unit formed by a drive motor connected with, as a single unit, at least one transmission, a control unit configured to control the drive unit, and a temperature sensor configured to detect a temperature of the drive unit.

10 Claims, 5 Drawing Sheets

(56) References Cited

FOREIGN PATENT DOCUMENTS

| EP | 2716529 A2 * | 4/2014 | ............ B62D 35/00 |
|----|----|----|----|
| FR | 2915169 B1 | 5/2009 | |
| JP | S 57158171 A | 9/1982 | |
| JP | 2008211861 A | 9/2008 | |

* cited by examiner

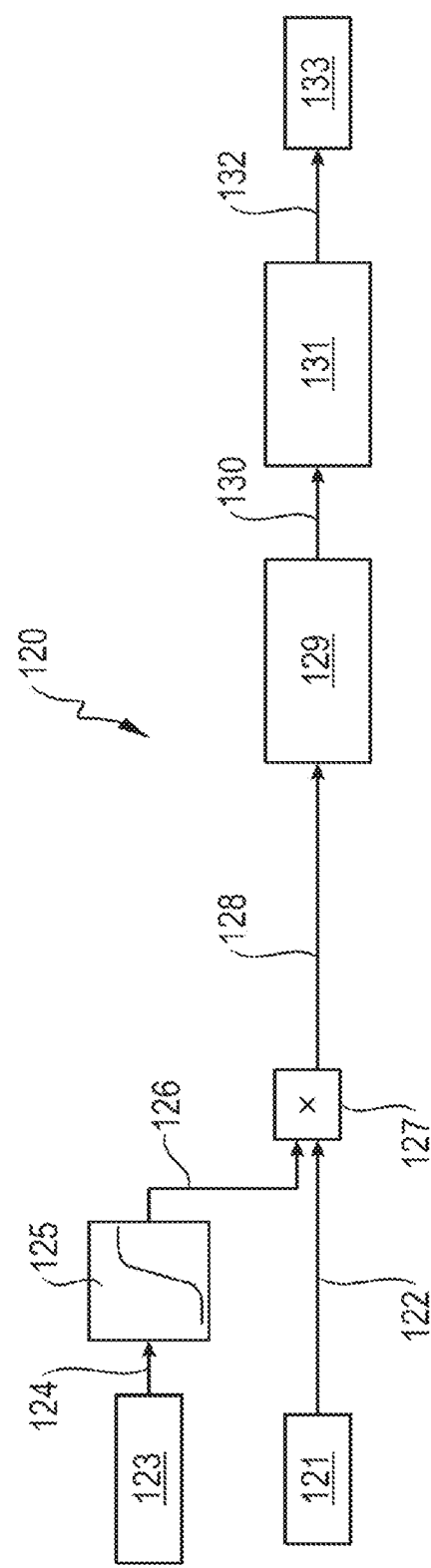

DRIVE UNIT AND METHOD FOR CONTROLLING A DRIVE UNIT, IN PARTICULAR FOR AN AIR DEFLECTOR ELEMENT OF A MOTOR VEHICLE

CROSS REFERENCE TO RELATED APPLICATIONS

This application claims benefit to German Patent Application No. DE 10 2018 102 820.2, filed Feb. 8, 2018, which is hereby incorporated by reference herein.

FIELD

The invention relates to a drive unit and to a method for controlling a drive unit, in particular for an air deflector element of a motor vehicle.

BACKGROUND

Motor vehicles are known to have spoiler elements as air deflector elements, which are extended or adjusted depending on the driving state or velocity. It is therefore known, for example, that a rear spoiler is retracted at low vehicle speeds and is extended starting from a predefined vehicle speed, in order to increase the downthrust.

DE 10 2013 100 518 A1 discloses an arrangement of a drive motor which is coupled via two drive shafts to one transmission which is connected to each of them, wherein the output shaft of the respective transmission is connected to the adjustment kinematics of the rear spoiler.

SUMMARY

In an embodiment, the present invention provides a drive unit for an air deflector element of a motor vehicle. The drive unit includes a drive motor transmission unit formed by a drive motor connected with, as a single unit, at least one transmission, a control unit configured to control the drive unit, and a temperature sensor configured to detect a temperature of the drive unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6 illustrates a block circuit diagram according to an embodiment of the invention.

DETAILED DESCRIPTION

Figure 1:
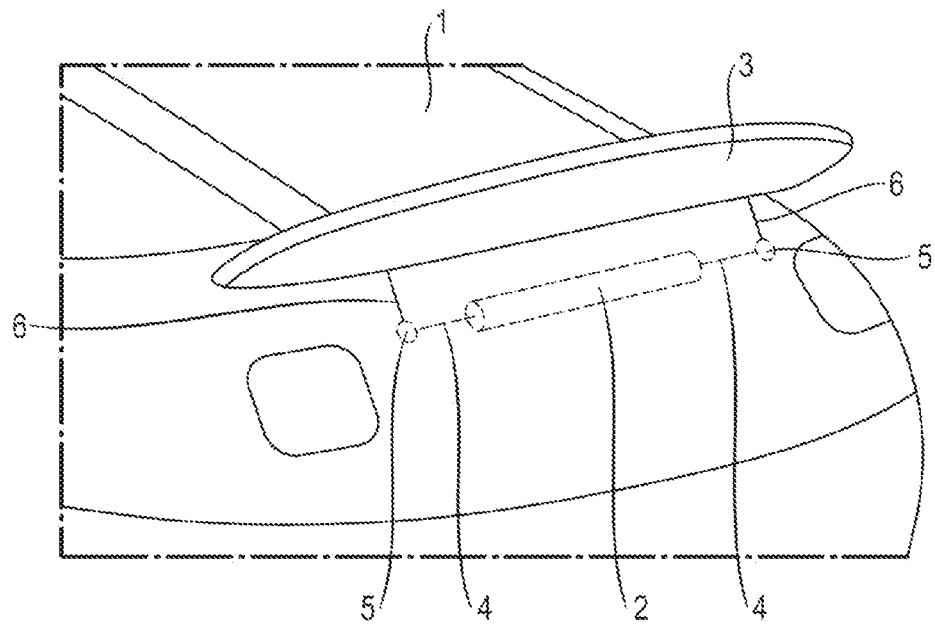
FIG. 1 illustrates a perspective partial view of a motor vehicle with a drive unit according to an embodiment of the invention.

Since a drive motor with a transmission exhibits, as a drive unit, respectively individually occurring tolerances, the drive ratios differ within the scope of the tolerance variation from one drive unit to another, which can give rise to complications during the use of such drive units. In particular it becomes apparent that in the case of changing external conditions the influences on the tolerances are large and therefore an adjustment speed can vary significantly, which tends to be undesirable.

Embodiments of the present invention therefore provide a drive unit and a method for controlling a drive unit which reduce or avoid disadvantages of prior art drive units.

An exemplary embodiment of the invention provides a drive unit, in particular for an air deflector element of a motor vehicle, having a drive motor with at least one transmission which is connected to the drive motor as one unit, forming a drive motor-transmission unit, wherein a control unit is provided in the drive unit in order to control the drive unit, and wherein a temperature sensor is provided which detects a temperature of the drive unit. As a result, the temperature can be taken account as an external influencing factor for the control.

It is particularly advantageous if the temperature sensor is arranged in/on the drive motor and/or in/on a transmission, and detects the temperature of the drive motor and/or of the transmission. As a result, the actually influencing temperature is determined and taken into account. If the temperature in the interior of the drive unit is determined, the temperature of any components which are influenced is also essentially recorded, and taking into account these temperatures brings about adaptive control. As a result it is possible to ensure that, for example, the adjustment speed is actuated independently of the temperature, resulting in comparable adjustment times under virtually all operating conditions.

In a further exemplary embodiment it is expedient if the control unit is arranged in/on the drive motor and/or in/on a transmission, wherein the temperature sensor is integrated into the control unit and detects the temperature of the drive motor and/or of the transmission. As a result, by integrating the temperature sensor into the control unit the expenditure on mounting is reduced because the temperature sensor does not have to be mounted separately.

In a further exemplary embodiment it is also advantageous if the control unit is arranged in/on the drive motor or in a transmission, wherein the temperature sensor is arranged in/on the drive motor or in/on a transmission, and detects the temperature of the drive motor or of the transmission. Therefore, the temperature can also be detected and taken into account if the temperature sensor is not part of the control unit.

It is also advantageous if the control unit has electronic components which are arranged on a circuit board, wherein the temperature sensor is also arranged on the circuit board of the control unit. As a result, the temperature sensor can advantageously already be taken into account and mounted during the production of the control unit. As a result, additional later handling of the control unit for the purpose of mounting the temperature sensor is avoided.

In a further advantageous exemplary embodiment, the drive motor is controlled as an electric motor by means of predefined characteristic curves, wherein the characteristic curves are selected and/or adapted on the basis of the temperature of the electric motor and/or of the transmission, such that control takes place taking into account the temperature determined by the temperature sensor. It is therefore possible to implement advantageous control in order to carry out control which tends to be independent of the temperature.

A further exemplary embodiment of the invention provides a method for controlling a drive unit, in particular for an air deflector element of a motor vehicle, having a drive motor with at least one transmission which is connected as one unit to the drive motor, forming a drive motor-transmission unit, wherein a control unit is provided in the drive unit in order to control the drive unit, and wherein a temperature sensor is provided which detects a temperature of the drive unit, the drive motor is controlled by means of predefined characteristic curves, wherein control takes place taking into account the temperature determined by the temperature sensor.

It is also advantageous if the drive motor is controlled as an electric motor by means of predefined characteristic curves, wherein the characteristic curves are selected and/or adapted on the basis of the temperature of the drive unit.

In a further refinement it is advantageous if the temperature sensor is arranged in/on the drive motor and/or in/on a transmission, and detects the temperature of the drive motor and/or of the transmission.

It is also expedient if the control unit adapts, as a function of the determined temperature, the minimum torque and/or the maximum torque of the drive unit and of the electric motor.

FIG. 1 shows a perspective partial view of a motor vehicle 1 with a drive unit 2 according to the invention for adjusting or activating an air deflector element 3, such as, for example, a rear spoiler. In this context, the air deflector element can also be, for example, another air deflector element such as, for example, a front spoiler etc.

The drive unit 2 for adjusting the air deflector element 3 of the motor vehicle 1 has a drive motor with at least one transmission, which is connected to the drive motor as one unit, and forming a drive motor-transmission unit, wherein the drive motor-transmission unit has, at its two axial end regions, a rotatable shaft 4 which can be driven by the at least one transmission in order to adjust the air deflector element 3.

In this context, the respective shaft 4 drives a mechanism 5 which causes levers 6, provided on both sides of the air deflector element, to raise or lower the air deflector element 3.

Figure 2:
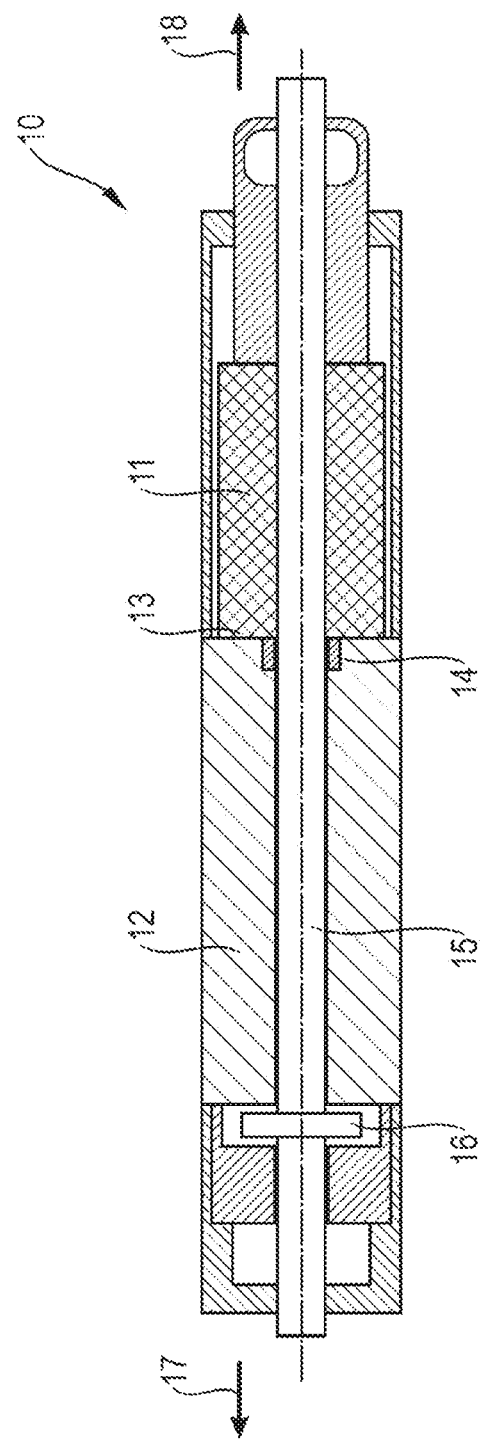
FIG. 2 is a schematic illustration of a first exemplary embodiment of a drive unit.

FIG. 2 shows an exemplary embodiment of a drive unit 10 according to the invention with a drive motor 11 and with a transmission 12 which is arranged axially adjacent to the drive motor 11 and is connected thereto to form one unit. The transmission 12 is correspondingly arranged at an axial end region 13 of the drive motor 11. On the output side of the drive motor 11, a hollow shaft 14 is provided which drives a transmission input element. On the output side of the transmission 12, a shaft 15 is provided. This shaft 15 is connected on the drive side to an output element 16 of the transmission 12.

In the exemplary embodiment in FIG. 1, the transmission 12 is a planetary gear mechanism, in particular a multi-stage planetary gear mechanism, such as, in particular, a three-stage or four-stage planetary gear mechanism.

The output element 16 of the transmission 12 is a planetary carrier in the present exemplary embodiment. The shaft 15 is therefore driven by the planetary carrier, and the shaft 15 is correspondingly connected to a planetary carrier of a planetary stage of the planetary gear mechanism.

However, the output element 16 can alternatively also be another element of the transmission.

FIG. 2 shows that the shaft 15 projects from the transmission 12 in a first axial direction 17, and in the other, second axial direction 18 it engages through the drive motor 11, of hollow design, and projects from said drive motor 11.

In the exemplary embodiment shown, the drive motor 11 is a hollow shaft motor through which the shaft 15 engages. In this context, the shaft 15 also engages through the hollow shaft 14.

Figure 3:
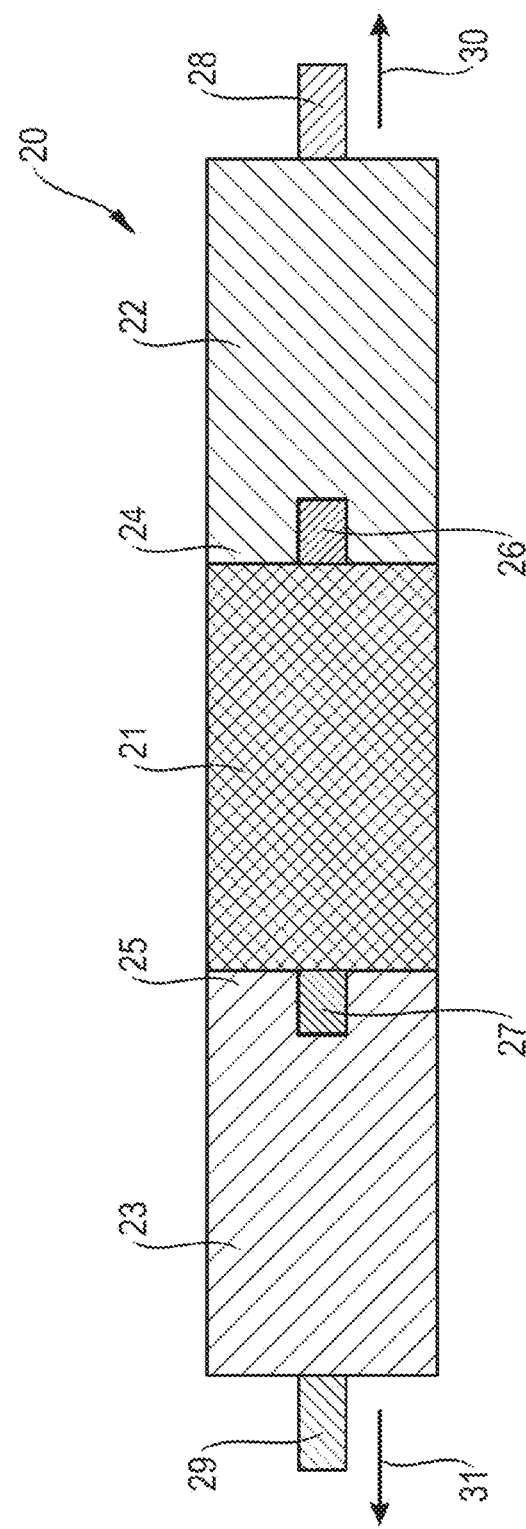
FIG. 3 is a schematic illustration of a second exemplary embodiment of a drive unit.

FIG. 3 shows a further exemplary embodiment of a drive unit 20 according to the invention with a drive motor 21 and with two transmissions 22, 23 which are each arranged at an axial end region 24, 25 of the drive motor 21 and are, in particular, attached and connected thereto to form one unit.

A transmission 22, 23 is therefore arranged at the two axial end regions 24, 25 with the drive motor 21, wherein the drive motor 21 has, at each of its two end regions 24, 25, a shaft 26, 27 which is connected on the drive side to the respective transmission 22, 23 with a transmission input element.

On the output side, in each case one shaft 28, 29 is provided which is driven in each case by the respective transmission. Therefore, in each case one rotatable shaft 28, 29 can be driven by means of the respective transmission 22, 23, wherein the respective shaft 28, 29 projects from the respective transmission 22, 23 in an axial direction 30, 31.

It is advantageous here if the respective transmission 22, 23 is a planetary gear mechanism, such as, in particular, the respective transmission 22, 23 is a multi-stage planetary gear mechanism, such as, in particular, a three-stage or four-stage planetary gear mechanism.

It is advantageous here if the respective shaft 28, 29 is connected as an output element to a planetary carrier of a planetary stage of the planetary gear mechanism.

Alternatively, another element of the transmission can also be provided as an output element of the respective transmission 22, 23.

Figure 4:
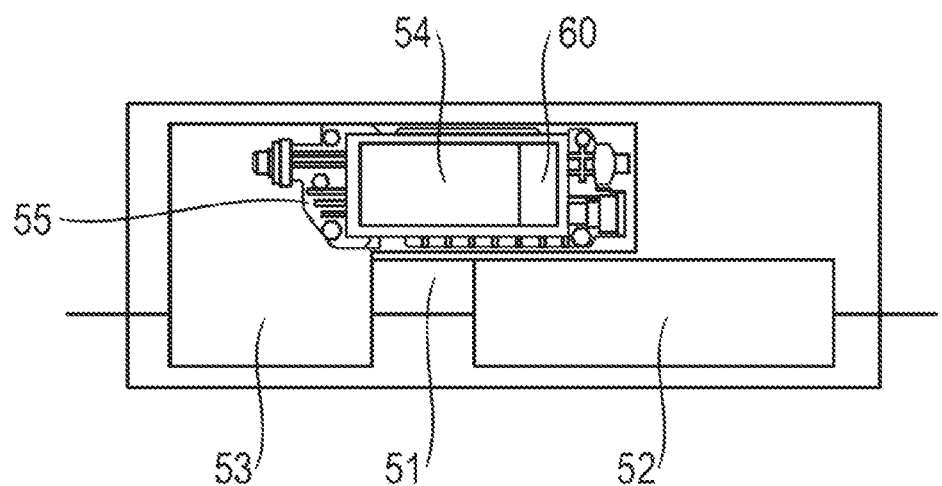
FIG. 4 is a schematic illustration of a drive unit with a control unit.

FIG. 4 shows a schematic illustration of a drive element 51 for adjusting an air deflector element of a motor vehicle.

The drive unit 51 has here a drive motor 52 and at least one transmission 53 which is connected to the drive motor 52 as one unit, forming a drive motor-transmission unit.

A control unit 54 in the drive unit 51 is optionally provided with a storage unit for controlling the drive unit, such as the drive motor 52 which is embodied as an electric motor. The control unit is advantageously and optionally an integrated part of the drive unit 51 here.

A temperature sensor 60, which detects the temperature of the drive unit 51, is provided in the drive unit 51.

The control unit 54 and/or storage unit are/is embodied on a circuit board 55, such as an electronic circuit board, which is an integrated part of the drive unit 51. It is also advantageous here if the temperature sensor 60 is an integrated part of the control unit 54 and is also optionally arranged on the circuit board 55 of the control unit 54.

The temperature sensor 60 is advantageously arranged in/on the drive motor and/or in/on a transmission, with the result that it detects the temperature of the drive motor and/or of the transmission.

It is also advantageous if the control unit 54 is arranged in/on the drive motor 52 and/or in/on a transmission 53, wherein the temperature sensor 60 is integrated into the control unit 54 and detects the temperature of the drive motor 52 and/or of the transmission 53. As a result this achieves integrative simplification of the mounting.

In a further exemplary embodiment it is also advantageous if the control unit 54 is arranged in/on the drive motor 52 or in/on a transmission 53, wherein the temperature sensor 60 is arranged in/on the drive motor 52 or in/on a transmission 53, and detects the temperature of the drive motor 52 or of the transmission 53. In this context, the temperature sensor 60 can also be arranged independently of the control unit 54, in particular on the assembly such as the drive motor 52 or transmission 53 on which the control unit 54 is not arranged. The control unit 54 can therefore also be arranged on the drive motor 52, and the temperature sensor 60 on the transmission 53, or vice versa.

FIG. 4 also shows that the control unit 54 has electronic components which are arranged on a circuit board 55, wherein the temperature sensor 60 is also arranged on the circuit board 55 of the control unit 54.

The drive motor 52 can advantageously be controlled as an electric motor by means of predefined characteristic curves. In this context, the characteristic curves can be selected and/or adapted on the basis of the temperature of the electric motor and/or of the transmission, with the result that control takes place taking into account the temperature determined by the temperature sensor.

Figure 5:
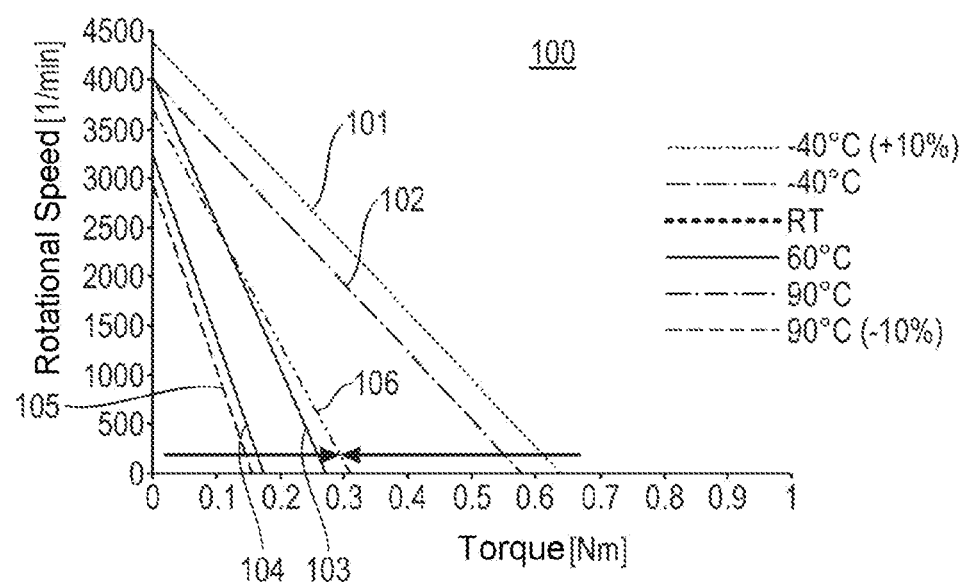
FIG. 5 is a diagram illustrating rotational speed curves as a function of torque.

FIG. 5 shows a diagram 100 with an illustration of characteristic curves 101 to 106 of the rotational speed of the electric motor plotted against the torque of the electric motor.

It is apparent that a number of characteristic curves 101 to 106 is illustrated. The characteristic curve 101 corresponds to the characteristic curve at 40° C. with a value of +10%, that is to say of 110% of the value at 40° C. The characteristic curve 102 corresponds to the characteristic curve at 40° C. The characteristic curve 103 corresponds to the characteristic curve at 60° C. The characteristic curve 104 corresponds to the characteristic curve at 90° C. The characteristic curve 105 corresponds to the characteristic curve at 90° C. with a value of +10%, that is to say of 110% of the value at 90° C. The characteristic curve 106 correspond to an idealized and temperature-corrected characteristic curve, that is to say to an optimized setpoint characteristic curve.

FIG. 6 shows a block circuit diagram 120 explaining an exemplary embodiment of a method according to the invention for controlling a drive unit, in particular for an air deflector element of a motor vehicle.

In block 121, the control unit receives a command to adjust, such as move, the air deflector element. For this purpose, in block 121 a setpoint value for the voltage of the electric motor 122 is determined, in particular in PWM, and output.

In block 123, the temperature of the drive unit is measured by means of the temperature sensor and output as a signal 124. In block 125, a correction value 126 is determined from the temperature value 124 and a table 125 or a characteristic curve and processed, such as multiplied with the value 122 in block 127, in order to obtain a temperature-compensated setpoint value 128, in particular in PWM. This temperature-compensated setpoint value 128 is predefined to the drive motor 129, such an electric motor, which generates from the setpoint voltage a setpoint torque value 130 which is transferred as an output torque to the kinematics of the air deflector element, such as the spoiler kinematics, so that an extension height 132 results from the torque, so that in block 133 the air deflector element is set to the extension height.

The measurement of the temperature therefore permits the drive motor to be controlled as an electric motor by means of predefined characteristic curves, wherein the characteristic curves are selected and/or adapted on the basis of the temperature of the drive unit, see blocks 125 to 127.

The control unit can therefore adapt, as a function of the determined temperature according to signal 124, the minimum torque and/or the maximum torque of the drive unit, such as that of the electric motor.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Motor vehicle
  2 Drive unit
  3 Air deflector element
  4 Shaft
  5 Mechanism
  6 Provided levers
10 Drive unit
11 Drive motor
12 Transmission
13 Axial end region
14 Hollow shaft
15 Shaft
16 Output element
17 First axial direction
18 Second axial direction
20 Drive unit
21 Drive motor
22 Transmission
23 Transmission
24 Axial end region
25 Axial end region
26 Shaft
27 Shaft
28 Shaft
29 Shaft
30 Axial direction
31 Axial direction
51 Drive unit
52 Drive motor
53 Transmission
54 Control unit
55 Circuit board
60 Temperature sensor
100 Diagram 101 Characteristic curve
102 Characteristic curve
103 Characteristic curve
104 Characteristic curve
105 Characteristic curve
106 Characteristic curve
120 Block circuit diagram
121 Block
122 Electric motor
123 Block
124 Signal, temperature
125 Block
126 Correction value
127 Block
128 Setpoint value
129 Drive motor
130 Torque setpoint value
132 Extension height
133 Block

What is claimed is:

1. A drive unit for an air deflector element of a motor vehicle, the drive unit comprising:
a drive motor transmission unit formed by a drive motor connected with, as a single unit, at least one transmission;
a controller configured to control the drive unit; and
a temperature sensor configured to detect a temperature of the drive unit,
wherein the controller is configured to control the drive motor, which is an electric motor, according to predefined characteristic curves,
wherein the predefined characteristic curves are selected or adapted based on a temperature of the electric motor or a temperature of the at least one transmission, the temperature sensor configured to detect as the temperature of the drive unit at least one of the temperature of the electric motor or the temperature of the at least one transmission.

2. The drive unit as claimed in claim 1, wherein the temperature sensor is arranged in or on the drive motor or in or on the at least one transmission.

3. The drive unit as claimed in claim 1, wherein the controller is arranged in or on the drive motor or in or on the at least one transmission, and wherein the temperature sensor is integrated into the controller.

4. The drive unit as claimed in claim 1, wherein the controller is arranged in or on the drive motor or in or on the at least one transmission, wherein the temperature sensor is arranged in or on the drive motor or in or on the at least one transmission.

5. The drive unit as claimed in claim 1, wherein the controller comprises electronic components arranged on a circuit board, and wherein the temperature sensor is also arranged on the circuit board of the controller.

6. The drive unit as claimed in claim 1, wherein the predefined characteristic curves comprise a plurality of rotational speed curves as a function of torque, each of the rotational speed curves being associated with a particular characteristic temperature.

7. A method for controlling a drive unit for an air deflector element of a motor vehicle, the drive unit having a drive motor with at least one transmission connected as a single unit to the drive motor thereby forming a drive motor-transmission unit, the method comprising:
detecting, by a temperature sensor, a temperature of the drive unit,
controlling the drive motor according to predefined characteristic curves and the temperature determined by the temperature sensor,
wherein the drive motor is controlled as an electric motor according to the predefined characteristic curves, wherein the predefined characteristic curves are selected or adapted based on the temperature of the drive unit.

8. The method as claimed in claim 7, wherein the temperature sensor is arranged in or on the drive motor or in or on the at least one transmission, and wherein the temperature sensor detects a temperature of the drive motor or of the at least one transmission.

9. The method as claimed in claim 7, wherein the method further comprises adapting, as a function of the determined temperature, a minimum torque and/or a maximum torque of the drive unit and of the electric motor.

10. A method for controlling a drive unit for an air deflector element of a motor vehicle, the drive unit comprising: an electric drive motor and a transmission connected as a single unit to the electric drive motor thereby forming a drive motor-transmission unit; and a temperature sensor configured to detect a temperature of the drive unit, the temperature of the drive unit comprising at least one of a temperature of the electric drive motor or a temperature of the transmission, the method comprising:
receiving a command to adjust the air deflector element;
determining, based on the command, a set point value for a voltage of the electric drive motor;
detecting, by the temperature sensor, the temperature of the drive unit;
determining a correction value based on the temperature of the drive unit and a plurality of predefined characteristic curves;
obtaining a temperature-compensated set point value based on the determined set point value and the determined correction value; and
operating the electric drive motor according to the obtained temperature-compensated set point value.

* * * * *